United States Patent
Sohara et al.

[11] Patent Number: 5,759,258
[45] Date of Patent: Jun. 2, 1998

[54] RECYCLING OF MINERAL FILLERS FROM THE RESIDUE OF A PAPER DEINKING PLANT

[75] Inventors: Joseph Andrew Sohara, Bethlehem; Trudy Diane Young, Nazareth, both of Pa.

[73] Assignee: Minerals Technologies Inc., New York, N.Y.

[21] Appl. No.: 404,680

[22] Filed: Mar. 15, 1995

[51] Int. Cl.⁶ .................................................. C09C 1/02
[52] U.S. Cl. ............................................................ 106/464
[58] Field of Search ............................... 106/405, 464

[56] References Cited

U.S. PATENT DOCUMENTS

| | | | |
|---|---|---|---|
| 2,470,577 | 5/1949 | Roderick et al. | 106/465 |
| 3,152,001 | 10/1964 | Podschus et al. | 106/464 |
| 3,320,076 | 5/1967 | Sutton | 501/150 |
| 3,765,921 | 10/1973 | Puskar | 106/457 |
| 4,408,723 | 10/1983 | Adrian et al. | 241/19 |
| 4,477,331 | 10/1984 | Reed et al. | 208/8 R |
| 4,553,977 | 11/1985 | Fry | 44/1 |
| 4,586,659 | 5/1986 | Easter, II | 241/24 |
| 4,769,149 | 9/1988 | Nobilet et al. | 210/603 |
| 4,932,336 | 6/1990 | Srowig et al. | 110/346 |
| 5,018,459 | 5/1991 | Judd | 110/346 |
| 5,054,406 | 10/1991 | Judd | 110/346 |
| 5,100,453 | 3/1992 | Richards | 65/27 |
| 5,250,100 | 10/1993 | Armbristor | 71/9 |
| 5,352,332 | 10/1994 | Maples et al. | 162/30.1 |
| 5,558,782 | 9/1996 | Bleakley et al. | 210/712 |

FOREIGN PATENT DOCUMENTS

| | | |
|---|---|---|
| 0 604 095 | 6/1994 | European Pat. Off. |
| WO 87/00544 | 1/1987 | WIPO |

*Primary Examiner*—Mark L. Bell
*Assistant Examiner*—Scott L. Hertzog
*Attorney, Agent, or Firm*—Marvin J. Powell; Terry B. Morris

[57] ABSTRACT

A method of recycling mineral pigments contained in the waste produced from the deinking of wastepaper. The deink residue is heated in an oxygen-containing atmosphere to a temperature sufficient to completely oxidize all the organic hydrocarbons present. Heat, water, and carbon dioxide also are generated and may be captured and reused in the process. Combustion causes a chemical reaction to occur, so that the original pigments contained in the deink residue are converted to new, stable mineral forms. The ash from the combustion is primarily a mixture of gehlenite ($Ca_2Al_2SiO_7$), anorthite ($CaAl_2Si_2O_8$) and perovskite ($CaTiO_3$). The ash containing the mixed mineral phases is added to a reactor in which carbon dioxide gas is bubbled through an aqueous slurry of calcium hydroxide so that precipitated calcium carbonate (PCC) is produced. Because the mineral phases in the ash contain calcium as part of their crystal structure, the PCC will precipitate and grow on the ash particles. This results in a "recycled" PCC pigment containing an ash "core." The properties of the recycled PCC are similar to virgin PCC.

13 Claims, 1 Drawing Sheet

RECYCLING OF MINERAL FILLERS FROM THE RESIDUE OF A PAPER DEINKING PLANT

TECHNICAL FIELD

This invention relates to the processing and reuse of mineral pigment fillers that are removed from paper as part of the deinking process. Such fillers are generally part of a complex mixture of wastes comprising mixed pigments (clays, calcium carbonates, titania, etc.), water, cellulose fibers, inks, toners, adhesives, etc. Generally, these wastes are either burned for the fuel content of the organic components or buried in a landfill. This invention describes a process for rendering these mineral fillers suitable for use as raw materials and as a substrate in a process to produce precipitated calcium carbonate (PCC) by the reaction of milk of lime ($Ca(OH)_2$) with carbon dioxide gas ($CO_2$).

BACKGROUND ART

The recycling of wastepaper generally involves separation of a usable pulp fiber from the other components of the paper, such as mineral fillers, printing inks, laser toner particles, and adhesives, through a series of steps that may be carried out in any way that is suitable to the purpose of the deinking plant and its customers. Regardless of the specific recycling process, two materials are always produced: (1) pulp fiber, called "secondary" fiber, that can be sold to a paper manufacturer for reuse as a raw material in the production of paper and (2) a composite waste material comprising a mixture of components that are removed as part of the deinking process. The composite waste material is called deink residue (DIR).

The amount of DIR that is generated will vary depending on the quality of the incoming wastepaper and the type of recycling process. Typically, on a dry basis, the fraction of DIR will be 15 to 40 percent by weight of the original wastepaper before deinking. Since the DIR is produced in a wet state, before the waste leaves the deinking process as much water as possible is removed to reduce handling and transportation costs. Generally, the waste is pressed to about 50 percent solids. Therefore, for every 100 tons of wastepaper processed, between 30 and 80 tons of wet DIR, half of which is water, will be produced. By the end of 1996, deinking plants in North America will recycle upwards of 3.5 million tons of wastepaper, and, therefore, will generate upwards of 1 million tons of wet residue.

In deinking plants that operate on the site of a papermill and are integrated with the mill, the DIR is often burned for its fuel content in the mill's white liquor recovery boilers. However, because of its high water content, DIR is a low-grade, inefficient fuel. In non-integrated deinking plants, the most common fate of the residue is a landfill. Landfilling is undesirable because it is both expensive and environmentally unfriendly. Thus, there has been a need to reduce the volume of waste generated at a deinking plant by reusing the mineral fillers and/or other components present in the residue mixture.

Many grades of paper contain functional mineral pigments, such as kaolin clays, calcium carbonate, titania, silicates, etc., which are incorporated into the paper when it is made. There has been no practical method of separating the mineral pigments from the organic portion of the waste, so that the mineral pigments can be reused in a product or process for making paper.

Previously, the wastes from papermaking or from recycling wastepaper have been incinerated, and the residue of the incineration has been deposited in a landfill or used to produce aggregate materials, typically for use in construction applications. This residual ash typically makes up about 15–20 percent by weight of the original weight of DIR.

In U.S. Pat. No. 4,932,336, a wet dewatered collected product of solids consisting predominately of cellulosic material (wood and cellulose fibers) and a residue consisting predominately of plastic pieces separated from waste paper prior to recycling are recovered separately. The collected product is dried to a residual water content of no more than 25 percent by weight of the product, and continuously layered to form a continuously advancing layer. A layer of the residue is deposited on the product layer to form a continuously advancing two layer bed, which is burned while bottom blowing the two layer bed with a gas containing air. In this process, the product and residue are destroyed, a combustion gas is produced, and a slag is recovered. Fly ash produced in the process can be added to the slag to prevent its release into the environment, and the slag is either deposited in a landfill, or used in a structural material. The heat from the combustion gas can also be used as a heat source, especially for steam generation.

U.S. Pat. No. 5,018,459 discloses a method and apparatus for the recycling of paper pulp sludge produced as a waste material in the manufacture of paper, cardboard, and related materials. The paper pulp sludge is continuously fed into a rotary kiln at a temperature of between 800° and 3500° F. If the temperature is maintained above 2400° F., hazardous materials such as dioxins, formed in the incineration process, are destroyed. Mixing catalysts, typically casein or soy protein, and wood pulp fibers are burned with the paper pulp sludge. The resulting incinerated product, consisting essentially of carbonate particles, can be used as a mineral filler binding agent in the manufacture of asphalt, asphalt coatings and sealants, ceramics, concrete, cement pipe, clay pipe, structural block, and brick, or as an absorbent for spilled oil. In U.S. Pat. No. 5,054,406, 15 to 25 percent by weight of the product of the incineration of paper pulp sludge is mixed with earthen clay to form a water retardant material that is used to cover and seal landfills.

U.S. Pat. No. 4,769,149 discloses a method for the recovery of energy from waste and residues comprising bacterial digestion of the waste followed by incineration, wherein the methane gas produced during the bacterial digestion is used to heat the furnace. The heat released in the combustion process can then used in an industrial process where it is required.

European Patent Application No. 0 604 095 discloses a process for treating a dilute aqueous suspension of particulate waste material, such as the material found in paper mill effluent. Kaolin clays are exemplified as typical waste materials. The process comprises precipitating an alkaline earth metal carbonate, e.g., calcium carbonate, in the aqueous suspension of particulate material, such that the particulate material present at the start of the process becomes entrained in the alkaline earth metal carbonate precipitate. FIG. 1 of EPA 0604 095 shows a scanning electron micrograph of flat "platy" kaolinite particles entrained in aggregations of precipitated calcium carbonate particles. The resulting agglomeration of calcium carbonate and entrained clay particles can be used as a paper filler or pigment.

There is still a need, however, for recycling of DIR in a manner that results in useful products rather than as landfill material. The present invention provides one such solution to this problem.

SUMMARY OF THE INVENTION

The present invention provides a process for the recovery and reuse of mineral pigments from the residue produced when wastepaper is deinked and processed into secondary pulp fiber. This process comprises heating the residue in an oxygen-containing atmosphere to a temperature, sufficiently high to completely oxidize all of the hydrocarbon materials in the deink residue to yield heat, carbon dioxide, and water, in addition to an ash formed from the non-combustible mineral pigments present in the wastepaper. In the present invention, the mineral ash from the combustion is mixed with calcium oxide and water to form a slurry of calcium hydroxide and ash. A gas containing carbon dioxide, which may be filtered and cooled flue gas, is bubbled into the mixture, and, as the calcium carbonate precipitates, it completely covers the available surface of the ash particles, which act as a substrate and provide nucleation sites for precipitation and growth to occur. The core of mineral ash below the PCC surface has little or no effect on the optical and physical properties typically exhibited by a so-called "pure" PCC particles, so that the "composite" PCC, particles produced can be used as a substitute for pure PCC particles in most processes or products where PCC is required with little or no adverse effect on product quality. Heat, water, and carbon dioxide produced by the combustion can be captured and recycled for use, as required, in the general process. In this manner, the waste of a typical deinking plant is substantially reduced.

DETAILED DESCRIPTION OF THE INVENTION

Figure 1:
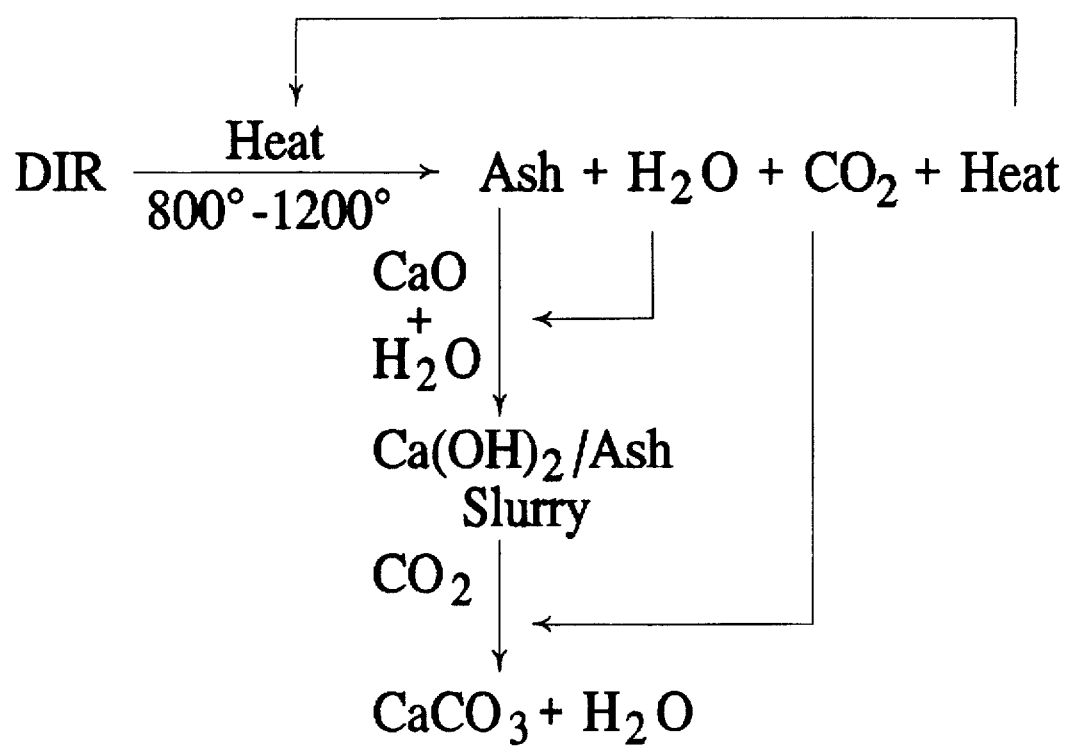
FIG. 1 is a flow chart of the process of the present invention.

A preferred embodiment of the invention is shown in FIG. 1. Deink residue is heated in an oxygen-containing atmosphere to a temperature that is sufficiently high, typically 800° to 1200° C., so that all organic hydrocarbons are oxidized, and completely and efficiently incinerated. The primary products of this combustion are heat, carbon dioxide, water and mineral ash. If required, the mineral ash is first milled, and then an aqueous slurry is prepared by mixing the mineral ash with an aqueous slurry of calcium hydroxide ($Ca(OH)_2$), which is formed by adding an excess of water to lime (CaO). Calcium hydroxide slurry is also known as milk-of-lime, slaked lime or simply slake. A gaseous mixture containing carbon dioxide is bubbled through the slurry, where the calcium hydroxide and carbon dioxide react to form PCC. Reaction parameters such as temperature, gas concentration and addition rate, slake concentration, etc. are controlled in such manner to produce the desired PCC crystal size and morphology. In the current invention, the PCC has been found to precipitate and grow upon the surface of the mineral ash that is present in the slake. Advantageously, the combustion products from the heating process are recycled, with the water used to form the slurry, the carbon dioxide used to precipitate PCC, and the heat used to dry additional DIR prior to incineration. Upon completion of the reaction, the surface of the mineral ash has been coated with PCC to form composite particles with essentially the same optical and physical properties possessed by pure PCC particles of similar size.

In another embodiment of the invention, mineral ash produced by the combustion of DIR is added to dry, unslaked lime (CaO). An excess of water is then added to the mixture to form a slurry of mineral ash and calcium hydroxide, and the carbonation reaction is then carried out as described above.

In a third embodiment of the invention, combustion of the residue is done as part of the calcination process in which limestone is converted to lime. This is possible because the temperature required for the calcination of limestone is similar to that required for efficient combustion of the DIR. Wet DIR and limestone are combined and fed into a lime kiln with the relative amount of each adjusted so that the fractions of mineral ash and lime in the product of the calcination are correct for slaking and carbonation.

It also will be recognized that the heat and carbon dioxide that are produced by the combustion of the hydrocarbon fraction of the DIR and are normally vented out the flue can be captured and recycled or redirected to earlier or later parts of the general process. Heat, for example, can be recycled back to the kiln to aid in the drying of the residue that is required before combustion can occur. Carbon dioxide, generated as the hydrocarbon fraction of the residue is incinerated, can be captured and used to carbonate calcium hydroxide to PCC.

The fact that mineral ashes can be coated or plated with precipitated calcium carbonate is unexpected. In the current invention, this is possible because the mineral ash that results from the combustion of DIR is formed by a more complex chemical reaction than simple calcination. For example, when kaolin clay ($H_2Al_2Si_2O_8 \cdot H_2O$) or calcium carbonate is heated in a kiln to high temperatures, the calcined mineral phase is produced; i.e., calcined clay or calcium oxide. In the current invention, it has been found that mixed mineral pigments react at high temperatures to form new, stable mineral phases. When calcium carbonate, kaolin clay and titanium dioxide are mixed in various proportions and heated to 800° to 1200° C., typically 1000° C., two, three, or more new phases in varying proportion are produced, including Gehlenite ($Ca_2AlSiO_7$) and/or Anorthite ($CaAl_2Si_2O_8$) with some Perovskite ($CaTiO_3$). The relative amount of each phase formed will depend upon the amount of each mineral present in the original mixture and the combustion temperature. It is believed that these new phases provide nucleation sites for the direct precipitation of calcium carbonate, which plates or is otherwise deposited onto the surface of the ash.

It can be readily seen that these mineral phases contain the same elements that make up the uncalcined mineral pigments, namely Calcium, Aluminum, Silicon, and Oxygen. The high temperature of combustion is believed to cause these materials to react and rearrange to form thermodynamically stable mineral phases. The presence of calcium atoms in the crystal lattice of Gehlenite, Anorthite and Perovskite renders the surfaces of these materials suitable as substrates upon which calcium carbonate can nucleate and grow. Calcium carbonate precipitates directly onto the surface of the ash particle, and completely covers or plates the particle with a layer of PCC that is bound to the ash. The process of the present invention does not merely trap, cage, or entrain the ash by forming PCC particles that stick together to surround particles of the ash, but, instead, actually precipitates calcium carbonate directly onto the ash surface to form a composite particle comprising an inner portion of mineral ash and an outer portion of PCC. The ash, in effect, acts as a "seed" and provides nucleation sites for calcium carbonate precipitation. Generally, the inner ash portion can comprise up to about 50 percent of the weight of the particle. In a typical particle, the ash portion will be in the range of 5 to 30 percent, and preferably between 10 and 25 percent. Of course, the greatest amount of ash is desirable, so that the greatest amount of ash can be recycled. In this regard, a 50:50 ash:calcium carbonate particle is considered to be the optimum formulation.

As deink residues are waste materials, the structure of the compositions will vary. Still, it also will be recognized that, if necessary, appropriate amounts of at least one calcium, aluminum or titanium compound or mixture therefore, preferably clay, titania, calcium carbonate or other appropriate material can be added to the waste before incineration, to form the appropriate mineral phases during combustion.

There is reason to believe that the amounts of Gehlenite, Anorthite and Perovskite that can be found in the composite PCC particles of the current invention are lower than can be accounted for by collection and analysis of material losses throughout the process described herein. If losses are occurring that cannot be otherwise explained, then it is likely that some or all of these mineral phases are being converted to PCC during the reaction. This may occur because of the relatively high pH in an aqueous slurry of calcium hydroxide, or because of other conditions that exist during the carbonation process.

The composite PCC particles of the current invention, either alone or mixed with so-called pure PCC particles, can be used in most applications where pure PCC particles currently is used. PCC is commonly used in the production of printing and writing grades of paper that require higher levels of functional mineral pigments, and recycled PCC can be used alone or in combination with pure PCC particles in most of these applications. In a typical application, the amount of PCC would range from about 1 percent to about 50 percent of the mixture. Recycled PCC can also be used where pure PCC particles is now used in paint and filled polymer applications. As other applications for pure PCC particles are discovered, it is likely that recycled PCC will also be found to be suitable. The examples indicate the qualities of the resulting recycled PCC, and one of ordinary skill in the art can easily determine the applications for which recycled PCC is suitable. Combinations of recycled PCC and pure PCC particles can be used, if desired or necessary, as both are compatible with regard to handling and processing as functional additives.

The surface area of the recycled and virgin PCC particles was obtained using a Micromeritics Flowcarb 2300, which employs BET theory with nitrogen as the absorbing gas. The particle size was determined by a sedimentation technique, using a Micromeritics Sedigraph Model 5100 on an aqueous dispersion of the product at about 3 percent, and using about 0.1 percent carboxylated polyelectrolyte (Daxad 30) as a dispersant. Dry brightness was measured using a Hunter LabScan.

Handsheets of a 60 g/m$^2$ paper were prepared with a Formax Sheet former (Noble and Wood type, manufactured by Adirondack Machine Corporation) from a furnish of 75 percent bleached hardwood and 25 percent bleached softwood Kraft pulps beaten to 400 Canadian Standard Freeness (CSF) at pH 7 in distilled water. Pulp consistency was 0.3125 percent. A synthetic sizing agent (alkyl ketene dimer) was added to the pulp at a level of 0.25 percent, equivalent to 5 lbs/ton of paper. Filler was added to the pulp furnish to achieve a target filler loading level. A retention aid (high density cationic polyacrylamide) was added to the pulp at a level of 0.05 percent, equivalent to 1 lb/ton of paper. The sheets were conditioned at 50 percent relative humidity and 23° C. for a minimum of 24 hours prior to testing.

TAPPI brightness was measured using TAPPI test method T452-om92. TAPPI opacity was measured according to TAPPI test method T425-om91. Porosity was measured on a Parker Print-Surf. Scott Bond was measured according to TAPPI test method UM-403. Breaking length was measured according to TAPPI test method T494-om88.

Sizing was tested by the Hercules Size test (HST) to measure penetration of liquid through the handsheets. HST is the test method used to determine the degree of sizing of paper in the instant invention. The test was performed on a Hercules sizing tester Model KA or KC, and the test method employed was TAPPI Method T-530 PM-89.

EXAMPLES

The following non-limiting examples are merely illustrative of the preferred embodiments of the present invention, and are not to be construed as limiting the invention, the scope of which is defined by the appended claims.

Recycled PCC was produced from two samples of wet deink residue, received from a commercial deinking plant. The samples, as received, contained approximately 50 percent by weight water. The samples were dried in an oven at 100° C., and the composition of each sample of dry solids was analyzed with X-ray diffraction. The results of the analysis are given in Table 1. All values are given as percent by weight of dry solids.

TABLE 1

|  | I | II |
|---|---|---|
| Organic Hydrocarbons | 57–59 | <50 |
| Calcite (CaCO$_3$) | 11–12 | 30–40 |
| Kaolinite (H$_2$Al$_2$Si$_2$O$_8$·H$_2$O) | 14–15 | 10–15 |
| Anatase (TiO$_2$) | 2–4 | 2–4 |
| Amorphous Phases | <5 | Not Detected |
| Talc | 0.5–1 | 0.5–1 |
| Rutile (TiO$_2$) | 0.5–1 | 0.5–1 |
| α-Quartz | 0.5–1 | Not Detected |

EXAMPLE I

Residue Sample I was incinerated in a muffle furnace for 2 hours at 900° C. The ash recovered from the furnace was deagglomerated using a hammer mill, and analyzed via X-Ray Diffraction (XRD). The results of the XRD analysis are given in Table 2. The values are approximate ranges given as percent by weight of total ash.

TABLE 2

| Gehlenite (Ca$_2$Al$_2$SiO$_7$) | 85–90 |
|---|---|
| Anorthite (CaAl$_2$Si$_2$O$_8$) | <5 |
| Perovskite (CaTiO$_3$) | 5–10 |

To form a calcium hydroxide slurry, 1607.2 grams of water were added to 229.6 grams of CaO, while vigorously stirring the mixture in a 4 liter stainless steel reactor equipped with a variable speed agitator. The calcium hydroxide slurry was passed over a 60-mesh screen before continuing the process. To the slurry were added 57.4 grams of the mineral ash of Table 2, and the temperature of the slurry was adjusted to 35.2° C. A carbon dioxide containing gas (15 percent in air) was bubbled through this mixture with vigorous agitation until the reaction was complete at the end of 115 minutes at a pH of 8.0. The resulting product was passed over a 325-mesh screen to remove grit, and the recovered +325-mesh residue was weighed and found to be only 10.661 grams. Scanning electron microscopy (SEM) and physical characterization of the recycled PCC were performed. The physical characteristics of the dry recycled PCC product, prepared by plating the mineral ash of Table 2 with PCC, are shown in Table 3.

TABLE 3

| Size Distribution via Sedigraph 5100: | |
|---|---|
| 90% smaller than | 5.89 µm |
| 50% smaller than | 1.91 |
| 20% smaller than | 1.17 |
| 10% smaller than | 0.79 |
| BET Specific Surface Area: | 8.7 m$^2$/g |
| Hunter Color Components (pigment): | |
| L (Lightness) | 95.9 |
| a | 0.2 |
| b | 1.8 |
| Morphology via SEM: | Scalenohedral |

The recycled PCC produced in Example I was tested for its performance in paper in a handsheet study using a Kraft fiber furnish. The results of the handsheet study are given in Table 7, and show that the recycled PCC of the present invention can be used effectively in papermaking in the same manner as pure PCC particles.

Measurements of the TAPPI brightness of handsheets incorporating recycled PCC and pure PCC particles indicate that high paper brightness can be obtained with recycled PCC. The TAPPI brightness of handsheets incorporating recycled PCC from Example I is within about 2 percentage points of handsheets incorporating virgin PCC. Therefore, recycled PCC can be used without incorporating virgin PCC in applications where maximum brightness is not required. The requirements of applications where maximum brightness is required or where control of the paper brightness is desired can be met by using a mixture of virgin PCC and recycled PCC. Preferred mixtures of virgin PCC and recycled PCC for use in a high quality paper would be between 10 percent and 50 percent.

The difference between the TAPPI opacity of handsheets incorporating recycled PCC and those incorporating virgin PCC was about 1 percentage point, which is within the range of the statistical accuracy of these measurements. Therefore, the showthrough of paper incorporating the recycled PCC of the present invention is equivalent to papers incorporating virgin PCC.

The water resistance of handsheets incorporating recycled PCC, as measured in an HST test, was equivalent to that of papers incorporating virgin PCC as filler when comparing equivalent size fillers.

The strength of handsheets incorporating recycled PCC is essentially equivalent to or slightly better than handsheets incorporating virgin PCC. However, the thickness of these handsheets is slightly greater than that of papers incorporating virgin PCC.

Finally, the porosity of recycled PCC papers is slightly higher than for virgin PCC, but not so high as to represent a significant disadvantage.

EXAMPLE II

Three (3) parts of deink residue Sample II (Table 1.) were combined with four (4) parts quarried limestone and placed in a pilot rotary kiln, The cylindrical kiln was gas fired, approximately 1.5 meters long and 16.5 cm in diameter. The kiln was set to operate at 1150° C., and nominal time of combustion was about 45 minutes. Following combustion, the lime/ash mixture was collected from the kiln and analyzed via XRD. The results are shown in Table 4. The results are given as the weight percent of the total of the total weight of limestone and deink residue.

TABLE 4

| Lime (CaO) | 70–80 |
|---|---|
| Gehlenite (Ca$_2$Al$_2$SiO$_7$) | 10–15 |
| Anorthite (CaAl$_2$Si$_2$O$_8$) | 7–10 |
| Perovskite (CaTiO$_3$) | 1–2 |
| Microcline (KAlSi$_3$O$_8$) | 1–2 |
| α-Quartz | 0.5–1 |

To form a slurry of calcium hydroxide and mineral ash, 2009 grams of water were added to 287 grams of the material of Table 4, while vigorously stirring the mixture in a 4 liter stainless steel reactor equipped with a variable speed agitator. The resulting calcium hydroxide/mineral ash slurry was passed over a 60-mesh screen before continuing the reaction, and 0.05 grams of residue were collected from the screen. The temperature of the slurry was adjusted to 35.5° C., and a carbon dioxide containing gas (15 percent in air) was bubbled into the mixture under vigorous agitation until the reaction was complete at the end of 121 minutes when the pH of the slurry reached 8. The recycled PCC slurry was passed over a 325-mesh screen to remove grit and other impurities, and 24.7 grams of +325-mesh residue were collected. Using XRD, the recycled PCC and the +325-mesh grit were analyzed, and the results are given in Table 5. The results are given as the weight percent of each material.

TABLE 5

| | Recycled PCC | +325-mesh Residue |
|---|---|---|
| Calcite (CaCO$_3$) | 89–94 | <0.5 |
| Portlandite (Ca(OH)$_2$) | <0.5 | <0.5 |
| Gehlenite (Ca$_2$Al$_2$SiO$_7$) | 4–7 | 20–25 |
| Anorthite (CaAl$_2$Si$_2$O$_8$) | 0.5–1 | 5–10 |
| Perovskite (CaTiO$_3$) | 1–2 | 20–25 |
| a-Quartz | 0.5–1 | 20–25 |
| Microcline (KAlSi$_3$O$_8$) | <0.5 | 20–25 |

The physical characteristics of the dry "recycled" PCC product of Table 5 are shown in Table 6.

TABLE 6

| Size Distribution via Sedigraph 5100: | |
|---|---|
| 90% smaller than | 2.73 µm |
| 50% smaller than | 1.39 |
| 20% smaller than | 0.96 |
| 10% smaller than | 0.71 |
| BET Specific Surface Area: | 14.8 m$^2$/g |
| Hunter Color Components (pigment): | |
| L (Lightness) | 97.2 |
| a | 0.0 |
| b | 1.1 |
| Morphology via SEM: | Scalenohedral |

The recycled PCC produced in Example II was also tested for its performance in paper in a handsheet study using a Kraft fiber furnish. Again, the results of the tests are given in Table 7, and show that the recycled PCC of the present invention can be used effectively in papermaking in the same manner as virgin PCC.

As in Example I, measurements of the TAPPI brightness of handsheets incorporating recycled PCC and virgin PCC indicate that high paper brightness can be obtained with recycled PCC. However, the TAPPI brightness of handsheets incorporating recycled PCC from Example II was equivalent, but at a slightly higher filler level, than that of handsheets incorporating virgin PCC.

Likewise, the TAPPI opacity of handsheets incorporating recycled PCC was equivalent to those incorporating virgin PCC, but at a slightly increased filler level. Therefore, the showthrough of the paper incorporating the recycled PCC of the present invention was essentially equivalent to that of papers incorporating virgin PCC.

The water resistance of handsheets incorporating recycled PCC, as measured in an HST test, was equivalent to that of papers incorporating virgin PCC as filler when comparing equivalent size fillers.

The strength of handsheets incorporating recycled PCC and virgin PCC was slightly lower than the control, again likely due to the differences in filler loading.

Finally, in Example II, the porosity of recycled PCC papers was slightly lower than that of virgin PCC paper, but well within an acceptable range.

TABLE 7

| PIGMENT | RECYCLED PCC EXAMPLE I | RECYCLED PCC EXAMPLE II | VIRGIN PCC 2.18 μm | VIRGIN PCC 1.23 μm |
| --- | --- | --- | --- | --- |
| PERCENT FILLER | 14.4 | 17.4 | 15.8 | 14.7 |
| OPACITY | 87.5 | 88.6 | 86.8 | 88.6 |
| BRIGHTNESS | 84.3 | 86.2 | 86.5 | 86.4 |
| BREAKING LENGTH | 2425 | 1946 | 2189 | 2242 |
| HERCULES SIZING | 105 | 1 | 101 | 2 |
| SCOTT BOND | 53 | 46 | 52 | 51 |
| POROSITY | 2203 | 1801 | 1958 | 2023 |

While it is apparent that the invention herein disclosed is well calculated to fulfill the objects above stated, it will be appreciated that numerous modifications and embodiments may be devised by those skilled in the art. It is intended that the appended claims cover all such modifications and embodiments as fall within the true spirit and scope of the present invention.

We claim:

1. A composite particulate material comprising an inner portion of an ash particle of mixed mineral pigments, and an outer portion of calcium carbonate which completely covers the available surface of said ash particle.

2. The composite particulate material of claim 1, wherein said ash is obtained from the incineration of wastepaper deink residue.

3. The composite particulate material of claim 1, wherein said ash comprises Gehlenite, Anorthite, Perovskite, or mixtures thereof.

4. The composite particulate material of claim 1, wherein the calcium carbonate is precipitated onto the surface of the inner portion of inorganic mineral material.

5. A process for making composite precipitated calcium carbonate particles which process comprises incinerating a wastepaper deink residue comprising mixed mineral pigments at high temperature to form ash particles; forming a slurry of calcium hydroxide and the ash particles, and carbonating the slurry to precipitate calcium carbonate directly onto the ash particles to form composite precipitated calcium carbonate particles, wherein said calcium carbonate completely coats said ash particles.

6. The process of claim 5, wherein the wastepaper deink residue is incinerated at a temperature of at least 800° C.

7. The process of claim 5, which further comprises adding at least one calcium, aluminum, or titanium compound or mixture thereof to the wastepaper deink residue prior to incineration.

8. The process of claim 7, wherein the compound is calcium carbonate, titania, a clay, or mixture thereof.

9. The process of claim 5, which further comprises forming a mixture of calcium hydroxide and water, and adding the ash to the mixture to form the slurry.

10. The process of claim 5, which further comprises mixing the ash with lime, and then adding water to the mixture of ash and lime to form the slurry.

11. The process of claim 5, which further comprises mixing the wastepaper deink residue with limestone, incinerating the wastepaper deink residue by calcining the mixture in a lime kiln to form ash and lime particles, and adding water to the particles to form the slurry.

12. The product produced according to the process of claim 5.

13. A composition formed by precipitating calcium carbonate so as to cover a mineral ash substrate having nucleation sites for precipitation of calcium carbonate.

* * * * *